(12) United States Patent
Gunkel et al.

(10) Patent No.: US 8,447,184 B2
(45) Date of Patent: May 21, 2013

(54) METHOD FOR THE RAMAN AMPLIFICATION OF OPTICAL SIGNALS AND TRANSMISSION SYSTEM

(75) Inventors: Matthias Gunkel, Darmstadt (DE); Ralph Leppla, Darmstadt (DE); Malte Schneiders, Darmstadt (DE); Sascha Vorbeck, Griesheim (DE); Werner Weiershausen, Eppershausen (DE); Michael Bousonville, Mainz (DE)

(73) Assignee: Deutsche Telekom AG, Bonn (DE)

( * ) Notice: Subject to any disclaimer, the term of this patent is extended or adjusted under 35 U.S.C. 154(b) by 885 days.

(21) Appl. No.: 11/917,391

(22) PCT Filed: Jun. 3, 2006

(86) PCT No.: PCT/DE2006/000965
§ 371 (c)(1),
(2), (4) Date: Dec. 28, 2009

(87) PCT Pub. No.: WO2006/136130
PCT Pub. Date: Dec. 28, 2006

(65) Prior Publication Data
US 2010/0135662 A1    Jun. 3, 2010

(30) Foreign Application Priority Data

Jun. 18, 2005   (DE) .................. 10 2005 028 357

(51) Int. Cl.
*H04J 14/02*    (2006.01)
(52) U.S. Cl.
USPC ............... 398/92; 398/94; 398/97; 398/177; 359/337.1

(58) Field of Classification Search
USPC ............... 398/92, 97, 160, 177, 94, 173, 175; 359/337.1
See application file for complete search history.

(56) References Cited

U.S. PATENT DOCUMENTS

| 6,556,341 B2 | 4/2003 | Krummrich et al. |
| 2002/0071173 A1* | 6/2002 | Lee et al. .................. 359/337.1 |
| 2002/0191277 A1* | 12/2002 | Chen et al. ................. 359/341.4 |
| 2003/0095323 A1* | 5/2003 | Onaka et al. ................ 359/334 |
| 2003/0133179 A1 | 7/2003 | Islam et al. |
| 2004/0136053 A1 | 7/2004 | Sugiya |

FOREIGN PATENT DOCUMENTS

| DE | 10057659 | 6/2002 |
| DE | 10256215 | 6/2004 |
| EP | 1278315 | 1/2003 |

OTHER PUBLICATIONS

M.N. Islam: "Raman Amplifiers for Telecommunications 1, Physical Principles"; Springer Series in Optical Sciences; Georgia Institute of Technology, Atlanta, 2003; title page + pp. 2-15 and 92-103.

* cited by examiner

*Primary Examiner* — M. R. Sedighian
(74) *Attorney, Agent, or Firm* — Leydig, Voit & Mayer, Ltd.

(57) ABSTRACT

A system and method for Raman amplification of optical signals in a wavelength division multiplexing (WDM) optical transmission system includes transmitting optical signals within a transmission band via an optical waveguide between a transmitter and a receiver, Raman-amplifying the optical signals with at least one pump so as to distort an amplification profile of the Raman amplification within the transmission band, and rectifying the distorted amplification profile so as to compensate for the distortion.

10 Claims, 5 Drawing Sheets

METHOD FOR THE RAMAN AMPLIFICATION OF OPTICAL SIGNALS AND TRANSMISSION SYSTEM

CROSS REFERENCE TO RELATED APPLICATIONS

This application is a U.S. National Phase application under 35 U.S.C. §371 of International Application No. PCT/DE2006/000965, filed Jun. 3, 2006, and claims benefit to German patent application DE 10 2005 028 357.8, filed Jun. 18, 2005. The international Application was published in German on Dec. 28, 2006 as WO 2006/136130 A1 under PCT Article 21 (2).

FIELD

The invention relates in general to a method for Raman amplification of optical signals, and to a transmission system, and in particular a wavelength division multiple access (WDM) transmission system, with Raman amplification.

BACKGROUND

Optical signal transmission has for many years being making inroads into almost every sector of data transmission. For this, the signals are typically directed via optical fibers, for example glass fibers. One of the essential difficulties to be noted is signal damping upon transmission over long distances. Amplifiers are typically incorporated into the transmission link in order to counteract signal damping.

The amplifiers most often used at present are erbium-doped fiber amplifiers (EDFAs). An EDFA is an amplifier made up of a glass-fiber segment, typically several meters long, doped with erbium. The doped glass-fiber segment behaves basically like a laser diode, and is pumped using pumps having a wavelength of 980 nm or 1480 nm.

Another amplification method has also recently been the subject of development, namely so-called Raman amplification, based on the quantum mechanical Raman effect. In Raman amplification a pump laser is typically coupled into the transmission fiber, i.e. an ordinary glass fiber, in order to bring about stimulated Raman scattering within the glass fiber.

These active optical Raman amplifiers have certain technical advantages as compared with EDFAs. These encompass at least the following:

The intrinsic noise of a Raman amplifier is much lower than that of an EDFA. The result is that a greater transmission range can be achieved for the communication systems, or a wider amplifier spacing can be implemented; this can lower acquisition and operating costs.

The amplification region can be selected largely without restriction over a wide range by adjusting the pump wavelength. In contrast thereto, the amplification behavior of an EDFA is an inherent, fixed property of erbium ions.

EDFAs become opaque to light after a failure, which can lead to a total failure of the entire transmission link. Raman amplifiers, on the other hand, lose their amplifying properties but remain transparent, so that the transmission link operates with reduced amplification but at least still remains open.

In addition, Raman amplifiers insert comparatively little polarization mode dispersion (PMD) into the transmission link, which is a great advantage over EDFAs especially for future WDM systems with a data rate of 40 Gbit/s.

Raman amplification methods are nevertheless also capable of further improvement.

SUMMARY

In an embodiment, the present invention provides a method for Raman amplification of optical signals in a wavelength division multiplexing optical transmission system. The method includes transmitting optical signals within a transmission band via an optical waveguide between a transmitter and a receiver, Raman-amplifying the optical signals with at least one pump so as to distort an amplification profile of the Raman amplification within the transmission band, and rectifying the distorted amplification profile so as to compensate for the distortion.

BRIEF DESCRIPTION OF THE DRAWINGS

An exemplary embodiment of the present invention will be described in more detail below and is schematically shown in the drawings, in which.

DETAILED DESCRIPTION

Figure 1:
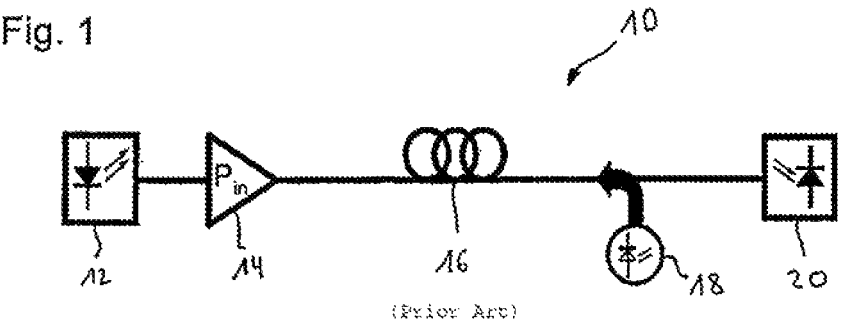
FIG. 1 schematically depicts a conventional Raman-amplified glass fiber communication system.

The inventors have therefore firstly considered the following aspects of Raman amplification of optical signals.

Raman amplifiers have hitherto typically been designed for the smoothest possible amplification profile, i.e. in a specific bandwidth in which signals are transmitted, signal amplification should be as frequency-independent as possible. Because the amplification spectrum of a Raman pump is highly frequency-dependent, the amplification spectra of multiple Raman pumps are in some cases combined. Two or more Raman pumps, which emit an optical pump power level (that must be appropriately selected) on different emission frequencies (that must likewise be appropriately selected), are therefore used (see also FIG. 1). The amplification ripple can thus be increasingly diminished as the number of Raman pumps increase.

In wavelength division multiplexing (WDM) signal transmission with optical amplification, the transmission range is limited by noise. An important component of the noise is so-called ASE (amplified spontaneous emission) noise, which rises with amplification but at a less than proportional rate. The proportion of the noise figure caused by ASE noise therefore drops with increasing amplification.

It is desirable to reduce the noise figure. This cannot be done, however, by simply selecting very high amplification, since with high amplification another disruptive effect, called Rayleigh scattering, must be taken into account. Rayleigh scattering dominates after a certain point and then increases sharply with amplification, which would degrade the noise properties of the Raman amplifier. A minimum therefore exists for the noise figure at a given amplification. In this minimum noise figure over amplification, the ASE noise accounts for the greatest proportion of the total noise.

In addition, the noise figure for Raman amplifiers is frequency-dependent. Conventionally, Raman pumps are adjusted so as to operate at this minimum noise figure over amplification, and so that the amplification exhibits the least possible frequency dependency in the transmission band. With this setting the noise figure for signals that are located closer to the pump frequencies on a frequency scale are poorer than for signals located farther away. In addition, the noise figure over frequency exhibits a ripple that is the inverse of the amplification ripple.

The usual (and, to the inventors' knowledge, only known) method at present is therefore to set the Raman amplification so that this minimum for the noise figure over amplification is reached with spectrally maximum amplification within the transmission band, so that a minimal noise figure and a maximally frequency-independent amplification are achieved simultaneously.

Although these known methods, considered in this extreme fashion, have encountered an apparently insurmountable barrier, a need nonetheless exists to further reduce the noise figure.

An embodiment of the present invention provides a method for Raman amplification of optical signals, and an optical communication system with Raman amplification, which exhibit a low noise figure that in particular is reduced as compared with known methods and systems.

An embodiment of the invention provides a method and system of this kind which ensure good transmission properties that, in particular, are improved as compared with known methods and systems.

An embodiment of the invention provides a method and system of this kind that can be integrated easily and economically even into existing systems, entail low operating costs and, in particular, eliminate the use of EDFA segments.

An embodiment of the present invention makes available a method for Raman amplification of optical signals in the context of signal transmission, which method is suitable in particular for a WDM transmission system, including DWDM, etc. In this context, optical signals are transmitted within the signal transmission band via an optical waveguide, e.g. an optical fiber, between a transmitter and a receiver. The optical signals are Raman-amplified within the optical waveguide by means of one or more Raman pumps. In other words, the amplification takes place within the usual undoped glass fiber, so that in contrast to EDFA, preferably no specially doped amplifier segments need to be inserted into the transmission link. Instead, it is sufficient to couple the Raman pumps into the conventional glass transmission fibers.

According to an embodiment of the present invention, the amplification profile of the Raman amplification within the transmission band is now distorted in controlled fashion. This distortion or predistortion is implemented, in particular, by the fact that the amplification profile is pre-elevated. For this, a predetermined pre-elevated target parameter for the amplification profile is defined, and an amplification profile that (as closely as possible) approaches this predetermined pre-elevated target parameter is established by appropriate selection and adjustment of the Raman pumps. In other words, the amplification profile is initially provided with a pre-emphasis with respect to a conventional frequency-independent target parameter of the amplification profile. The distorted or pre-elevated amplification profile is then rectified or lowered again in order to compensate again, by means of the (preferably passive) rectification, for the controlled distortion.

As a result, surprisingly, the effective noise figure in the transmission band can be reduced with respect to conventional Raman-amplified systems, and despite the pre-emphasis of the amplification profile of the Raman amplification, a relatively frequency-independent amplification profile is obtained after de-emphasis.

This results in enormous quality and cost advantages, since the signal-to-noise ratio can be improved or transmission links between the amplifiers can be made longer.

A non-distorted first amplification profile that is adapted to the signal frequencies in the transmission band therefore initially exists for the transmission system; more precisely, the profile's maximum or maxima is or are adapted to the signal frequencies in the transmission band. Preferably, the maximum or maxima of this non-distorted first amplification profile lies or lie within the transmission band.

There also exists, in the form of the distorted amplification profile, a second amplification profile that is pre-elevated in predetermined fashion with respect to the first amplification profile. The first amplification profile is approximated to a constant target parameter, and the second amplification profile to a target parameter that is pre-elevated with respect to the constant target parameter and, in particular, is not constant.

The distortion of the second amplification profile is preferably carried out by means of a shift of the pump frequency or frequencies of the Raman pump(s) with respect to the pump frequency or frequencies for the non-distorted first amplification profile.

In particular, the pump frequency or frequencies of the Raman pump(s) for the distorted second amplification profile is/are shifted in each case, with reference to the pump frequency or frequencies for the non-distorted first amplification profile, to a higher frequency and/or away from the transmission band. This causes a lowering of the effective noise figure.

Particularly preferably, the distortion of the amplification profile is achieved in such a way that the amplification profile of the Raman amplification is pre-elevated in the upper frequency region of the transmission band, so that the amplification profile within the transmission band is defined toward higher frequencies by a function (aside from local maxima) substantially rises. It is additionally preferred, therefore, that the target parameter (ideal reference function) for the pre-elevated amplification profile is a function that increases, in particular continuously, toward higher frequencies within the transmission band.

As a result, the center point of the amplification profile in the transmission band shifts, after distortion or pre-emphasis and before rectification or de-emphasis, from the center to the upper edge of the frequency region of the transmission band. A linear approximation of the amplification profile within the transmission band after distortion or pre-emphasis and before rectification thus exhibits a significant slope over the frequency.

This frequency can, in particular, be selected to the point that the maximum of the amplification profile is located, after distortion and before rectification, at the edge of the transmission band. A shift in such a way that the maximum of the amplification profile is located, after distortion and before rectification, outside the transmission band may be associated with increased cost, but ought not to be ruled out.

It has proven advantageous to elevate the amplification profile in the upper frequency region of the transmission band by at least 5 dB, particularly preferably by approximately 8 dB, with respect to the lower frequency region of the transmission band. A reduction in the effective noise figure by approximately 0.7 dB or more can thereby be produced.

According to a particularly preferred embodiment of the invention, multiple Raman pumps having different pump frequencies are used for Raman amplification, so that the amplification profiles of the multiple Raman pumps overlap one another to yield a total amplification profile, and the total amplification profile of the Raman amplification within the transmission band is pre-elevated by means of a shift of the pump frequency of one Raman pump, or of the pump frequencies of several of the Raman pumps, preferably all the Raman pumps, with reference to a non-distorted total amplification profile, i.e. one approximately constant in the transmission band.

In particular, the distortion of the active Raman amplification and the passive rectification within the glass fiber are adapted to one another in such a way that the amplification maximum, after distortion of the amplification profile and subsequent rectification, lies in the transmission band, and the amplification after rectification is once again as constant as possible. In other words, a linear approximation of the amplification profile in the transmission band is once again at least approximately constant.

In particularly simple fashion, an optical filter can be used for rectification after Raman amplification, in order to compensate for the distortion or filter the signals inversely to the distortion.

Pump lasers are usefully used as Raman pumps. Furthermore, the pump lasers are coupled into the waveguide oppositely to the signal transmission direction in order to produce the Raman amplification within the glass fiber.

For transmission over longer distances, the overall link is subdivided into multiple transmission links, and the distorting amplification and compensating rectification are carried out respectively at the end of each transmission link by means of a pump-rectifier unit according to an embodiment of the present invention. In addition, an input amplifier for the signals to be transmitted is provided within the overall link after the transmitter.

The transmission system can thus be set up by proceeding as follows:

Firstly a setpoint for the Raman amplification, e.g. for the average amplification, within the transmission band is defined, which setpoint correlates with one or more first pump frequencies for a non-distorted first amplification profile, adapted to the setpoint, within the transmission band. One or more second pump frequencies are then determined for a second amplification profile distorted with respect to the first amplification profile, and one or more pumps having the second pump frequency or frequencies are made available for Raman amplification of the signals to be transmitted, the second pump frequencies being shifted with respect to the first pump frequencies. The pump power levels are preferably likewise modified in order to achieve the second distorted amplification profile. Means are also made available for rectification of the distorted second amplification profile with reference to the setpoint.

FIG. 1 shows, by way of example, a conventional transmission system 10 with Raman amplification. Optical signals are transmitted by a transmitter 12, preamplified by an input amplifier 14, over a glass fiber link 16 having a length of, for example, 80 km. At the end of transmission link 16, the optical signals are Raman amplified by means of pump lasers 18 and then received by a receiver 20. The principle of Raman amplification of optical signals in a glass fiber is fundamentally known to one skilled in the art.

Figure 2:
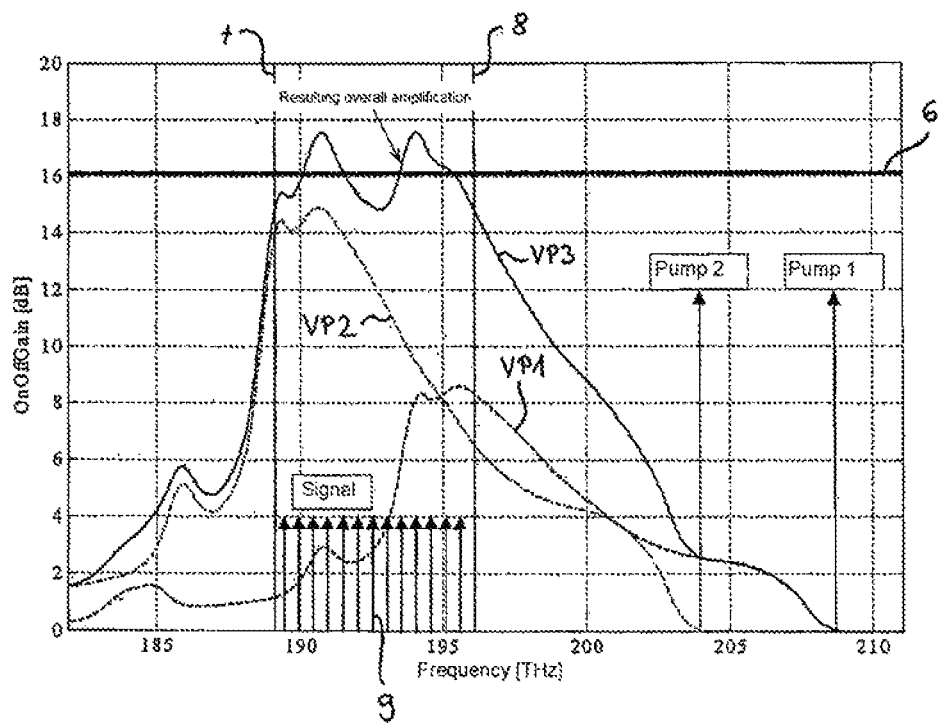
FIG. 2 shows the superposition of two amplification profiles to yield a total amplification profile as a function of frequency.

Referring to FIG. 2, a transmission system having two pumps 1 and 2, more precisely pump lasers, will now be considered. Each pump 1, 2 generates a respective amplification profile (OnOffGain) VP1, VP2, which profiles are depicted by the dashed and dot-dash lines respectively. The two individual amplifications of Raman pumps 1 and 2 ultimately overlap one another to yield a total amplification profile VP3 depicted by the solid line.

The transmission band, i.e. the region in which signal amplification is intended to take place, lies in this example between 189.1 and 196.1 THz of the relative frequency plotted on the X axis. A predetermined average amplification (OnOffGain) of (in this example) approximately 16.1 dB is defined, and is depicted by horizontal line 6. The two vertical lines 7 and 8 delimit the transmission band between 189.1 and 196.1 THz. The signals to be amplified are depicted schematically as arrows 9. The pump frequencies of pump lasers 1, 2 generally have a higher frequency than signals 9 in the transmission band (Stokes condition). In this example, the pump frequencies are approximately 204 and 209 THz.

Figure 3:
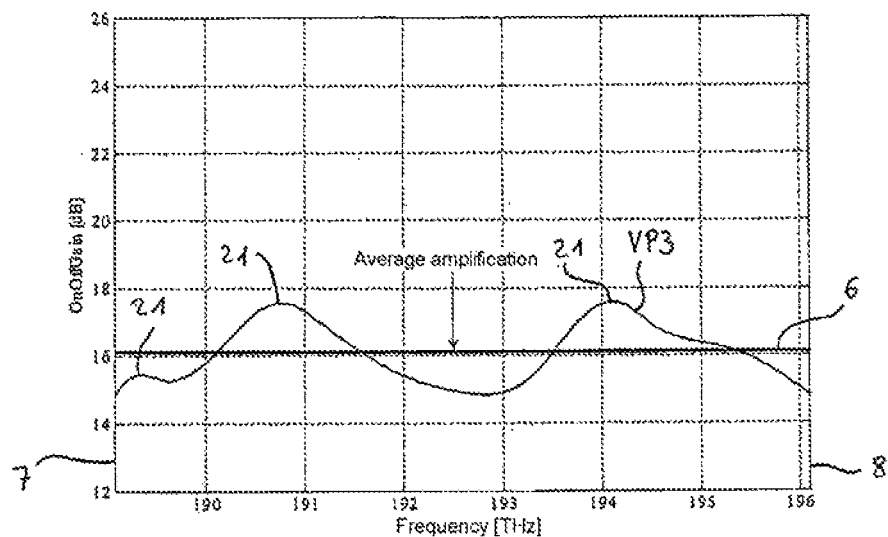
FIG. 3 shows a portion of the total amplification profile of FIG. 2 in the transmission band.

Referring to FIG. 3, the amplification region that is important for signal transmission, i.e. the transmission band, is shown enlarged. The total amplification profile is established in such a way that the two amplification maxima are localized within the transmission band at approximately 190.8 THz and approximately 194.1 THz, and total amplification profile VP3 within the overall transmission band is equal to at least approximately 15 dB. Total amplification profile VP3 fluctuates, within the transmission band, by less than 2 dB around the target parameter of average amplification value 6, and the center point of the portion of total amplification profile VP3 within the transmission band is located approximately at the center of the transmission band.

Figure 4:
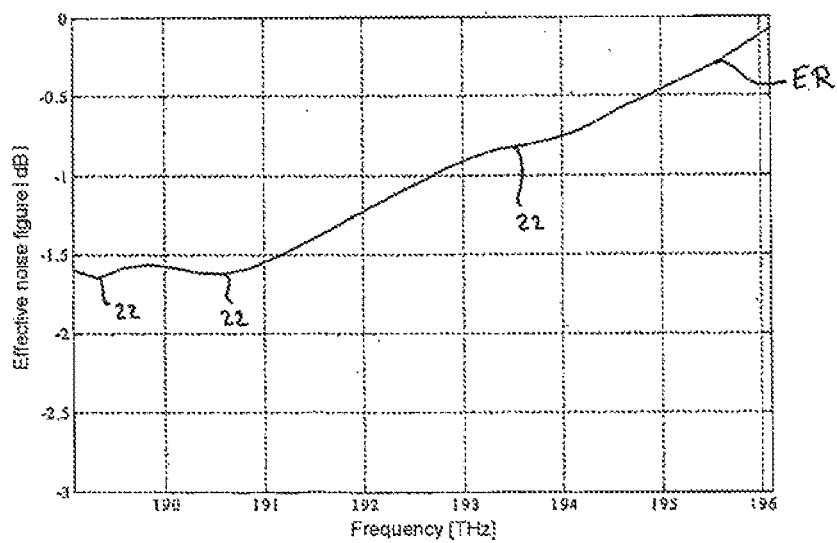
FIG. 4 shows the effective noise figure in the transmission band as a function of frequency.

FIG. 4 shows, as a function of relative frequency, effective noise figure ER pertinent to total amplification profile VP3 depicted in FIGS. 2 and 3. Effective noise figure ER expresses how high the noise figure of an equivalent EDFA, having the same noise behavior for the same amplification, would need to be. The reader is referred in this connection to the article "Raman Amplifiers for Telecommunications," 1, Springer (2003), by M. N. Islam, the entirety of which is hereby made a subject of this disclosure by reference. The curve depicted in FIG. 4 is typical; effective noise figure ER can, by definition, certainly be negative (as in this example).

A comparison with FIG. 3 shows that small dips, labeled 22 in FIG. 4, occur at points of high amplification corresponding to the local maxima 21 in FIG. 3. A correlation thus exists between the amplification profile and noise profile. It is furthermore clearly apparent that the effective noise figure increases toward higher frequencies or with decreasing offset from the pump frequencies (to the right in FIG. 4). In conventional systems, the noise figure maximum in this region limits the transmission range.

Proceeding therefrom, the following aspects were considered:

The noise figure depends directly on the dominant ASE noise, as defined by:

$$F = F_{Schrot} + F_{ASE} + F_{Ray} \quad (1)$$

$$= \frac{1}{G_{OnOff}} + \frac{\rho^+_{ASE}(L)}{hvG_{OnOff}} + \frac{P^+_{Ray}(L)}{hvB_F G_{OnOff}}.$$

The ASE noise can accordingly be modeled as follows (cf. "Raman Amplifiers for Telecommunications," 1, Springer (2003), by M. N. Islam):

$$\frac{d\rho^+_{ASE}(z)}{dz} = -\alpha_S \rho^+_{ASE}(z) + \sum_i C_{Ri} P_i(z)(\rho^+_{ASE}(z) + hvE_i) + S\alpha_R \rho^-_{ASE}(z) \quad (2)$$

$$-\frac{d\rho^-_{ASE}(z)}{dz} = \quad (3)$$

$$-\alpha_S \rho^-_{ASE}(z) + \sum_i C_{Ri} P_i(z)(\rho^-_{ASE}(z) + hvE_i) + S\alpha_R \rho^+_{ASE}(z)$$

$$E = \frac{1}{1 - e^{-\frac{k\Delta v}{kT}}} \quad (4)$$

in which:
$B_F$=bandwidth of receiving filter
$C_{Ri}$=Raman amplification coefficient (of the i-th pump)
E=spontaneous emission factor
F=total noise figure
$F_{Schrot}$=noise figure resulting from shot noise
$F_{ASE}$=noise figure resulting from ASE noise
$F_{Ray}$=noise figure resulting from Rayleigh noise
$G_{OnOff}$=Raman amplification (OnOffGain)
h=Planck's constant
k=Boltzmann constant
$P_i$=Power level (of i-th light wave)
$P_{Ray}$=Rayleigh noise power level
$R_{Ray}^+(L)$=Rayleigh noise power level at receiver
S=Rayleigh backscattering coefficient
z=position in longitudinal direction of glass fiber
$\alpha_R$=fiber damping resulting from Rayleigh backscattering
$\alpha_S$=fiber damping
$\Delta v$=frequency difference between signal and pump
v=optical frequency
$\rho_{ASE}$=spectral noise density (ASE)
$\rho_{ASE}^+(L)$=spectral noise density at receiver The superscripted plus and minus signs identify the propagation direction of the ASE noise: plus means propagation in the forward direction, and minus in the reverse direction. The term $$hvE_i$$

in the sums according to equations (2) and (3) represents the magnitude of the ASE noise that is generated.

Figure 5:
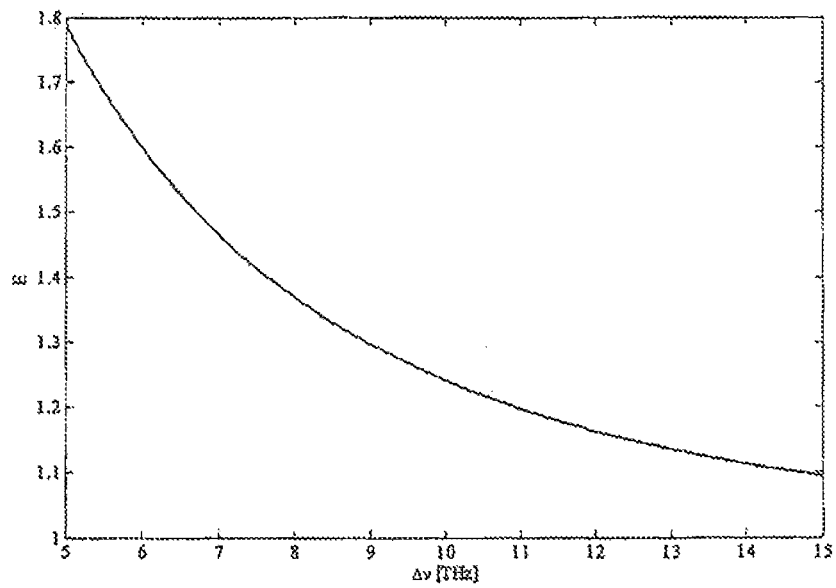
FIG. 5 shows the spontaneous emission factor E as a function of the frequency difference ($\Delta v$) between signal and pump.

FIG. 5 shows spontaneous emission factor E as a function of frequency difference $\Delta v$ between pump and signal, according to equation (4). According to equation (4) and as graphically presented in FIG. 5, the spontaneous emission factor decreases as frequency difference $\Delta v$ between pump and signal becomes larger. In order to minimize the spontaneous emission factor E and therefore the generation of ASE noise, it is therefore proposed to increase the frequency difference between pump and signal.

Initially, however, this runs directly counter to the goal of a maximally constant amplification function, since the amplification maximum is then no longer located in the transmission region, and amplification becomes highly frequency-dependent. This is, however, generally undesirable in the context of the transmission systems under discussion, e.g. in WDM transmission systems. One skilled in the art is therefore faced at this point with an apparently insurmountable obstacle due to the contradiction between these two goals.

The inventors have nevertheless now found a way to resolve this contradiction, as follows:

Step 1: Controlled Distortion

According to an embodiment of the present invention the pump frequencies are shifted, with respect to the conventional total amplification profile depicted in FIGS. 2 and 3, away from the signal transmission band in the direction of higher emission frequencies, in order to lower the noise figure maximum (at the right-hand edge of FIG. 4) in controlled fashion. The resulting (and, in principle, undesirable) shift in the amplification maximum and the (also in principle undesirable) elevated frequency dependence in the transmission region are, initially, deliberately accepted.

Figure 6:
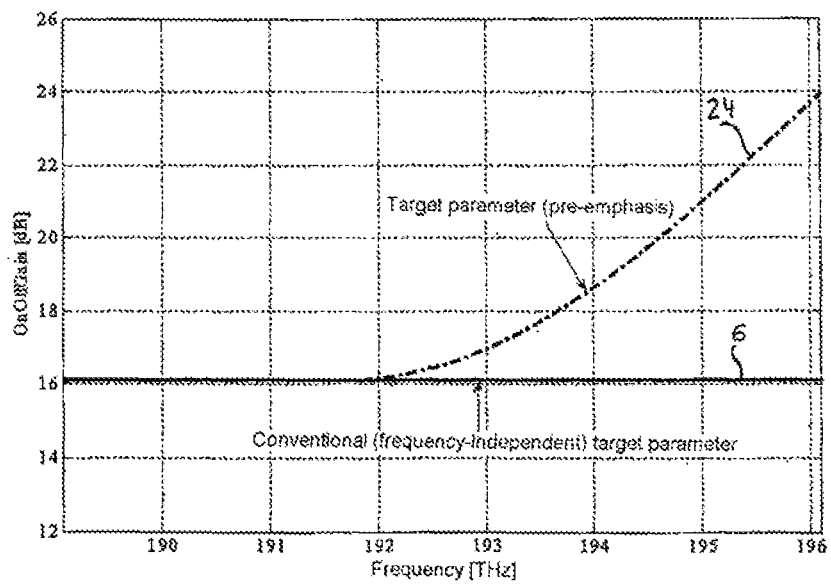
FIG. 6 shows target parameters for the amplification profile in the transmission band as a function of frequency, with and without pre-emphasis.

In a first step, the goal of frequency-independent amplification is therefore abandoned. The intention instead, in the context of the present invention, is to produce higher amplification on that side of the transmission band next to which the pumps are located, i.e. to define a target parameter that is pre-elevated at higher frequencies. FIG. 6 shows an example of a pre-elevated target parameter 24 of this kind (dot-dash line) for the Raman amplification, compared with a conventional constant target parameter 6 (solid line). The pre-elevated target parameter 24 is elevated at the upper end of the transmission band, i.e. at higher frequencies and in the direction of the pump frequencies, by about 8 dB with respect to the lower end, i.e. at lower frequency and away from the pump frequencies, or with respect to the conventional constant target parameter 6. The pre-elevated target parameter 24 is therefore a function that rises continuously toward higher frequencies. This pre-elevation is referred to as "pre-emphasis."

In terms of an embodiment of the invention, this means that the pump frequencies and pump power levels must be set differently, in order to approach the pre-elevated target parameter or function 24, than they would be if a frequency-independent amplification spectrum of the Raman amplification, or a constant target parameter 6, were required. Because the total frequency response of the amplifier is a superposition of the amplification profiles of all the pumps involved, the geometric shape of the Raman profile of each individual pump (in this example, pumps 1 and 2) causes the pump frequencies to be moved farther from signal transmission band 7, 8, and their power levels to be adapted or optimized toward the new target parameter 24.

Figure 7:
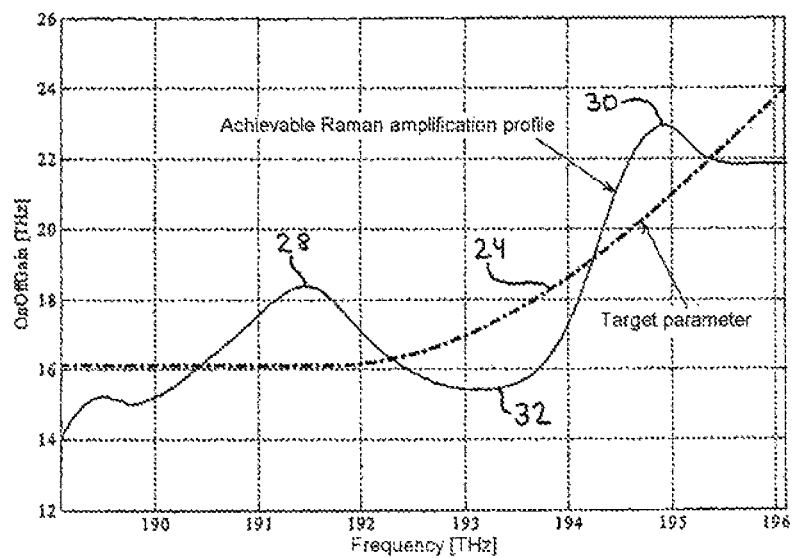
FIG. 7 shows an amplification profile for the Raman amplification in the transmission band as a function of frequency, after pre-emphasis and before de-emphasis.

FIG. 7 shows the optimized actual amplification profile 32 accounting for pre-emphasis, i.e. the profile adjusted or approximated according to an embodiment of the present invention to target parameter 24 in accordance with said pre-elevated parameter depicted in FIG. 6.

The shift in the pump frequencies of the two pumps 1 and 2 away from the transmission region toward higher frequencies (to the left in FIG. 7) is evident from the position, likewise shifted toward higher frequencies, of amplification maxima 28, 30 (cf. 21 in FIG. 3) of the pre-elevated amplification profile 32 (solid line in FIG. 7).

Figure 8:
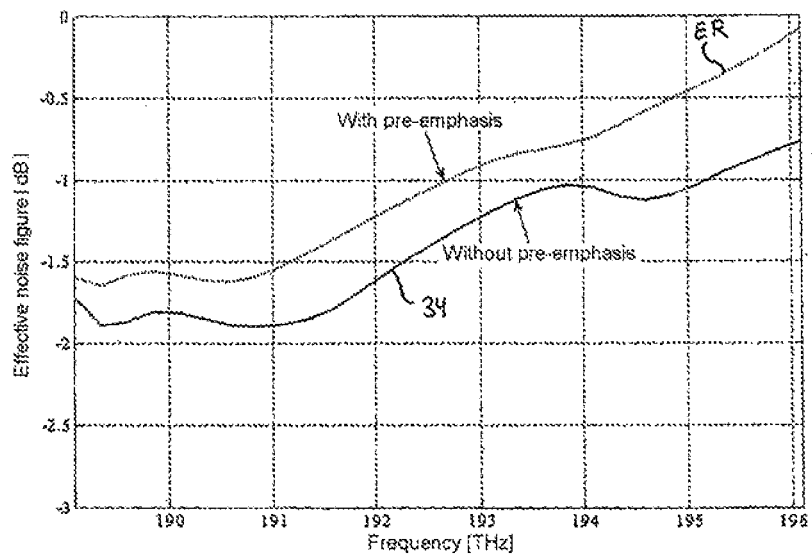
FIG. 8 shows the effective noise figure in the transmission band as a function of frequency, with and without pre-emphasis.

Referring to FIG. 8, noise figure profile 34 (solid line) achieved with the method according to an embodiment of the present invention is plotted against frequency. Also depicted is conventional noise figure profile ER (dotted line) without the inventive pre-elevation of the amplification profile. Because the noise figure depends on the one hand on amplification and on the other hand (to a greater extent) on the frequency offset between the signal lasers and pump lasers, what results is a lowering of noise figure profile 34 as compared with noise figure profile ER. Even in this simple example with only two Raman pumps 1, 2, a definite decrease in the noise figure maximum in noise figure profile 34, by about 0.7 dB with respect to conventional noise figure profile ER, is already apparent in the transmission band. If more effort is put into pre-emphasis, the inventors estimate that a reduction of 1 dB or even more can be achieved. This corresponds to an increase in system range of approximately 25%, so that for the same performance, the costs for amplifiers can be decreased by a quarter.

Step 2: Rectification

Figure 9:
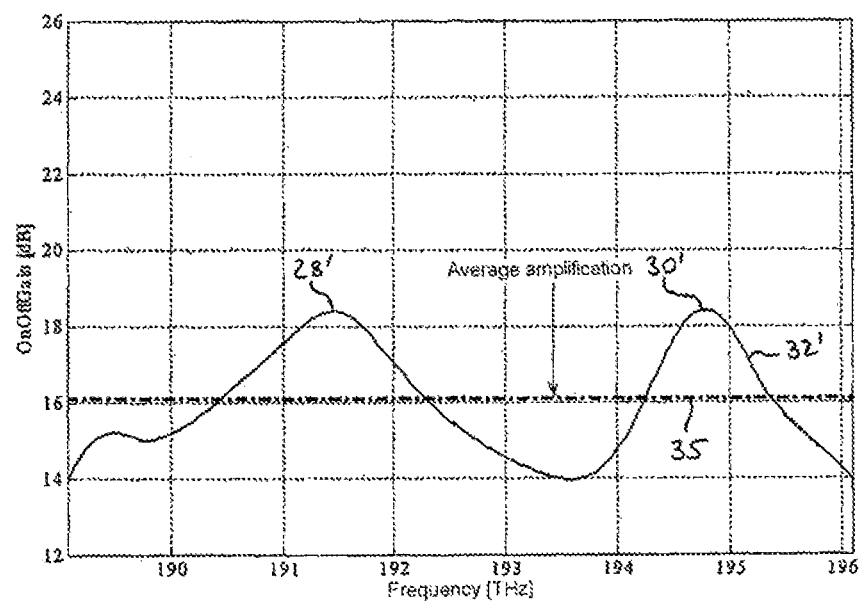
FIG. 9 shows an amplification profile in the transmission band as a function of frequency, after pre-emphasis and de-emphasis.

Up to this point, the transmission system still has an undesirably distorted amplification profile 32. This is now rectified again in a second step. Rectification, or de-emphasis, compensates (preferably as much as possible) for the influence of pre-emphasis on the amplification frequency response. FIG. 9 shows the resulting amplification profile 32' after distortion and subsequent rectification.

Within the existing boundary conditions, the frequency response in the transmission region is thus once again as constant as possible, or approaches a constant average amplification 35 and fluctuates around it. Amplification maxima 28', 30' are accordingly also once again located in the transmission region, although the reduced noise figure (as indicated by reference number 34 in FIG. 8) is retained.

Figure 10:
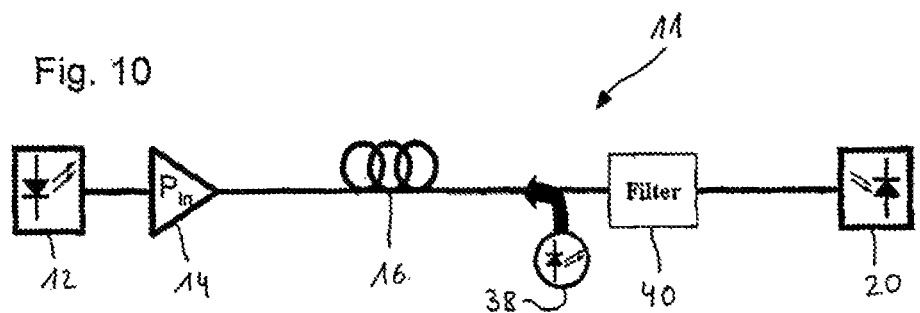
FIG. 10 schematically depicts a Raman-amplified glass fiber WDM communication system according to the exemplifying embodiment of the invention.

FIG. 10 shows the general construction of a Raman-amplified WDM system 11 according to an embodiment of the present invention, i.e. having frequency-shifted Raman pumps and a de-emphasis filter 40 for noise figure improvement. Optical signals are emitted by transmitter 12 and preamplified by an input amplifier 14. The signals are then transmitted via glass fiber link 16. At the end of transmission link 16, the optical signals are Raman-amplified by means of two frequency-shifted pump lasers depicted jointly by the symbol 38 in FIG. 10. For this, the multiple pump lasers 38 are coupled into the conventional glass fiber link 16 oppositely to the transmission direction. The rectifier or de-emphasis filter 40 is arranged directly behind pump lasers 38. De-emphasis filter 40 is embodied in simple fashion as an optical filter, i.e. as a passive component. The signals can then be received by receiver 20.

Figure 11:
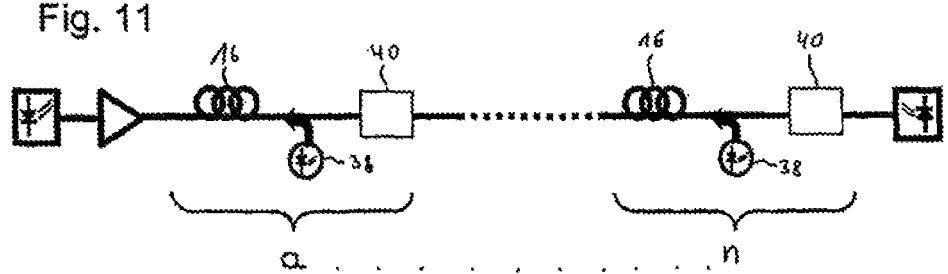
FIG. 11 is the same as FIG. 10, but with multiple transmission links and amplifier/filter units.

Alternatively, multiple glass fiber links 16 and amplifier/filter units 38, 40 can be connected one behind another, as indicated in FIG. 11 by brackets a through n.

It is evident to one skilled in the art that the embodiments described above are to be understood as examples, and the invention is not limited thereto but rather can be varied in multifarious ways without departing from the spirit of the invention.

The invention claimed is:

1. A method for setting up a wavelength division multiplexing optical transmission system with Raman amplification, in which optical signals are transmittable within a transmission band via an optical waveguide between a transmitter and a receiver, the method comprising:
defining a first target parameter for an average amplification for Raman amplification within the transmission band, the first target parameter being correlated with one or more first pump frequencies and a non-distorted first amplification profile being defined by the one or more first pump frequencies;
determining one or more second pump frequencies for a second amplification profile that is distorted with respect to the first amplification profile, wherein the second amplification profile is pre-elevated according to a second target parameter having increased gain at relatively higher frequencies of the transmission band;
providing one or more pumps having the second pump frequency or frequencies for the Raman amplification of the signals to be transmitted; and
providing a rectifier for rectifying the distorted second amplification profile such that a rectified amplification profile is generated according to a target parameter having substantially constant gain at all frequencies of the transmission band for operating the transmission system.

2. The method according to claim 1, wherein distortion of the second amplification profile is carried out by setting the second pump frequency or frequencies to be shifted relative to the one or more first pump frequencies.

3. The method according to claim 2, wherein the second pump frequency or frequencies is shifted away from the transmission band.

4. The method according to claim 1, wherein a center point of the distorted second amplification profile in the transmission band, before rectification, at an upper edge of a frequency region of the transmission band.

5. The method according to claim 1, wherein a maximum of the distorted second amplification profile is located, before rectification, at an edge of or outside of the transmission band.

6. The method according to claim 1, wherein an upper frequency region of the transmission band of the distorted second amplification profile is elevated by at least 5 decibels (dB) relative to a lower frequency region of the transmission band.

7. The method according to claim 1, wherein multiple pumps having different pump frequencies are used for the distorted second amplification profile, and wherein amplification profiles of the multiple pumps overlap one another to yield the distorted second amplification profile.

8. The method according to claim 1, wherein after rectification, an amplification maximum of the rectified amplification profile lies in the transmission band.

9. The method according to claim 1, wherein the rectification is carried out by an optical filter.

10. The method according to claim 1, wherein the one or more pumps having the second pump frequency or frequencies comprise a laser and the laser is coupled into the optical waveguide oppositely to the signal transmission direction.

* * * * *